3,240,729
POLYURETHANES FROM PHOSPHORAMIDATES
Peter Albert Theodore Hoye, Dunsley, Stourbridge, and David Eastwood, Billesley, Birmingham, England
No Drawing. Filed Nov. 30, 1962, Ser. No. 241,140
Claims priority, application Great Britain, Dec. 12, 1961, 44,420/61
6 Claims. (Cl. 260—2.5)

This invention relates to novel polyurethane materials and to methods for their production. In particular the invention is concerned with the provision of polyurethane materials which are flame-retardant, that is if ignited by a flame they will not continue to burn when the flame is removed.

Polyurethane materials, particularly those in cellular form, hereinafter termed polyurethane foams, are finding an increasing commercial use particularly in upholstery and for heat and sound insulation. The non-cellular materials find use as elastomers. However, polyurethane materials suffer from the disadvantage that they are combustible and, to overcome the consequent fire hazard which militates against the acceptance of them for purposes for which their other properties such as lightness and resiliency render them eminently suitable, many attempts have been made to render them flame retardant. As the incorporation of chemically inert additives in a foam gives rise to difficulties in providing a homogeneous material and as such additives tend to migrate to the surface of the foam, it is desirable to impart a built-in or inherent flame-retardance to the polyurethane materials by reacting into the polymeric molecule some structural units the presence of which confers the desired property.

Polyurethane materials are produced by interacting an organic polyhydroxy compound with an organic polyisocyanate. If a cellular polyurethane is to be produced it is preferred that this interaction should take place in the presence of a small controlled quantity of water added either initially or during the course of the reaction. Polyurethane foams may be flexible, semi-rigid or rigid depending on the nature of the polyhydroxy compound employed and the degree of cross-linking of the urethane polymer.

Certain organic phosphorus compounds having a common general formula have now been found to be capable of incorporation in polyurethane molecules and to confer thereto a degree of inherent flame-retardancy, without affecting the essential characteristics of the polyurethane material. Such phosphorus compounds are the amido-derivatives of phosphoric acid esters known as phosphoramidates. These compounds are difunctional and react with isocyanates so that the phosphoramidate becomes incorporated, that is copolymerised, into the polyurethane molecule.

Accordingly, the present invention provides an improvement in a process for the production of a polyurethane material involving the interaction of an organic polyhydroxy compound with an organic polyisocyanate, which comprises replacing up to 50% by weight of the polyhydroxy compound with a phosphoramidate of the general formula $(RO)_2P(=O)NH_2$, wherein each R is an alkyl, alkenyl or substituted alkyl or alkenyl group having from 1 to 10 carbon atoms or an aryl or substituted aryl group. The invention also provides polyurethane materials whenever produced by such a process.

The phosphoramidates for present use may be obtained by reaction of the dialkyl or diaryl phosphorochloridate $(RO)_2P(=O)Cl$ with ammonia, the phosphorochloridate being obtained by chlorination of a dialkyl or diaryl phosphite $(RO)_2P(=O)H$ with chlorine or sulphuryl chloride. However, more preferably the chlorination and amination steps are carried out together, the dialkyl or diaryl phosphite being reacted with a mixture of ammonia and carbon tetrachloride. The preparation of phosphoramidates has previously been described in the chemical literature. They are mostly crystalline solids which are soluble in polar compounds such as the polyhydroxy compounds which are used in the preparation of the polyurethanes.

Among the phosphoramidates that may be employed there may be mentioned dibutyl, dihexyl, dioctyl, dinonyl and diallyl phosphoramidates as well as the diphenyl and ditolyl compounds. However, it is preferred that the alkyl or aryl groups contain halogen atoms as their presence adds to the degree of flame-retardancy imparted to the polyurethane material. Thus the preferred phosphoramidates for present use are the di-(2-chloroethyl) and di-(bromoethyl), di-(2,3-dibromopropyl), di-(chlorophenyl) and di-(bromophenyl) phosphoramidates.

In the production of the present polyurethane materials, the phosphoramidate is normally premixed with the polyhydroxy compound and this premixture then reacted with the polyisocyanate. As the phosphoramidate is usually compatible with the polyhydroxy compound and itself reacts with the polyisocyanate, it is readily incorporated into the polyurethane molecule produced to confer a measure of inherent flame-retardancy on the polymer material.

The phosphoramidate may be employed to replace up to 50% by weight of the polyhydroxy compound required, that is the phosphoramidate may be used in an amount up to an equal weight of the polyhydroxy compound. However, satisfactory results are normally obtained when from 15–25% by weight of the mixture of polyhydroxy compound and phosphoramidate consists of the phosphoramidate, and an amount of 20% on this basis is preferably employed.

The polyurethane material of the invention is produced by reacting the polyisocyanate with the polyhydroxy compound and the phosphoramidate making use of techniques for producing polyurethane materials in various forms such as elastomers and foams which have been described in the literature. Preferably a polyurethane foam is produced by the use of a small controlled amount of water as foaming agent. As is well-known the water may be added initially with the other ingredients of the reaction mixture (preferably being premixed with the polyhydroxy compound) or subsequently to a prepolymer prepared from the polyhydroxy compound and polyisocyanate optionally together with a further amount of the polyhydroxy compound or polyisocyanate. The foams may be made by continuous or discontinuous mixing methods and may, if desired, be subjected to a heat treatment as an after-cure. The foaming may be assisted or promoted by a blowing agent, for example by the use of a low boiling fluorocarbon. The resulting foam may be rigid, semi-rigid or flexible depending mainly on the nature and amount of the polyhydroxy compound employed.

The polyisocyanate employed may be an aliphatic or aromatic diisocyanate such as toluene or diphenylmethane di-isocyanate.

The polyhydroxy compounds for present use which can be used singly or in admixture are preferably polyethers, polyesters or polyesteramides each containing at least two hydroxy groups, that is having a hydroxyl functionality of at least 2, and preferably having a molecular weight of at least 400. As polyethers there may be employed with advantage condensation products of an alkylene oxide with a nucleating compound which is itself a compound having from 2 to 4 functional groups, usually a hydroxy compound, so that the preferred polyethers have a hydroxyl functionality of from 2 to 4. The polyether is preferably a linear polypropylene ether glycol or a condensation product of propylene oxide with a tri- or tetra-functional nucleating compound such as glycerol, trimethylolpropane, hexanetriol or pentaerythritol, the glycol or condensation product desirably having a molecular weight of 1000 to 4000. Other suitable polyethers include mixed condensation products of propylene and ethylene oxides, either with themselves or with a nucleating compound, and polymers of tetrahydrofuran. Some of the various polyesters which may be used are set out in some detail in British patent specification No. 892,136. The polyesters are normally esters of glycols and/or glycerol, trimethylolpropane or pentaerythritol with dicarboxylic acids such as adipic, phthalic or maleic acids, singly or in admixture. The polyesters have at least two free hydroxyl groups and preferably have a hydroxyl functionality of from 2 to 4.

The production of the polyurethane materials is preferably carried out in the presence of catalysts and/or surface-active agents as is known in the art. Of particular value is the use of tertiary amines, organotin compounds and tin carboxylate salts as catalysts and silicone oils and modified silicone polymers containing oxyalkaline groups as cell-controlling agents.

The invention will now be illustrated by the following examples in which all quantities are expressed on a weight basis, and in which Examples 1–3 illustrate the production of flexible polyether polyurethane foams, Examples 4 and 5 the production of rigid polyether polyurethane foams and Examples 6 and 7 the production of polyurethane foams produced from a hydroxyl-containing polyester.

*Example 1*

A polyether condensate of propylene oxide and glycerol having a molecular weight of approximately 3000 (90 parts) was mixed with bis-(2-chloroethyl) phosphoramidate (10 parts) at a temperature of 70–80° C. and the mixture allowed to cool. The mixture was the further mixed during about 10 seconds with the aid of a mechanical stirrer with toluene di-isocyanate (41 parts), a modified silicone polymer having oxyethylene groups (1.25 parts) and dibutyltin dilauryl mercaptide (0.125 part). Immediately there was then added triethylene diamine (0.5 part) and N-ethyl morpholine (0.5 part) as activators and water (3.0 parts) as foaming agent and stirring was continued for a further 15 seconds before it was discontinued and the reaction mixture allowed to foam. There was obtained a flexible polyether-based polyurethane foam which exhibited a slight contraction when the foam was cured in an oven at 100° C. for 20 minutes.

The foam was shown to be flame-retardant by igniting a pile of 8 matches placed in a heap on the foam. The foam showed a slight tendency to burn while the matches were burning, but after the matches had burnt out the foam burnt only very slowly and then only for a short period.

It was shown that a similar foam could be obtained if the mixture of polyether and phosphoramidate were initially mixed together at room temperature and that this did not contract on curing as before. However, a more even dispersion of the polyether and phosphoramidate was obtained by mixing with heating.

*Example 2*

The method of Example 1 was repeated but using bis-(2-bromoethyl) phosphoramidate and only 40 parts of the di-isocyanate. The flame-retardancy of the resulting polyurethane foam was, however, slightly less than that shown by the foams of Examples 1 and 2.

Polyurethane foams of similar retardancy were also obtained when the example was repeated using quantities of the bis-(2-bromoethyl) phosphoramidate up to 25% based on the total weight of the polyether and phosphoramidate.

*Example 3*

A polyether condensate as employed in Example 1 (70 parts) was mixed at room temperature with dinonyl phosphoramidate (30 parts), which had been prepared from 3,5,5-trimethylhexanol. The mixture was then further mixed with toluene di-isocyanate (43 parts) and dibutyltin dilauryl mercaptide (0.1 part) during about 10 seconds with the aid of a mechanical stirrer. Immediately there was then added triethylene diamine (0.25 part) and N-ethyl morpholine (0.5 part) as activators and water (3.0 parts) as foaming agent and stirring was continued for a further 15 seconds before it was discontinued and the reaction mixture allowed to foam.

The polyurethane foam obtained was observed to exhibit only a small degree of flame-retardancy compared to that obtained in Example 1 and this was increased but slightly when the example was repeated using 50 parts of the polyether, 50 parts of the dinonyl phosphoramidate and 47 parts of the toluene di-isocyanate.

*Example 4*

There were mixed together 80 parts of a hydroxyl-containing polyether condensate of molecular weight of the order of 3000 and functionality greater than 2 sold by I.C.I. Ltd. under the trade name Daltolac 41 and containing water-activators and structures modifiers and 20 parts of bis-(2-chloroethyl) phosphoramidate by heating the two components to 60% followed by cooling. To the mixture there were added while stirring 217 parts of a diphenyl di-isocyanate and the mixture stirred mechanically for about 7 seconds after mixing and the mixture then allowed to foam.

The resulting polyurethane foam showed very little tendency to burn when subjected to the match test of Example 1, only the area directly below the matches being charred.

A similar rigid foam was prepared but using 75 parts of the polyether, 25 parts of the phosphoramidate and 207 parts of the di-isocyanate. The resulting rigid polyurethane foam was shown to have an increased flame-retardance.

*Example 5*

The initial process of Example 4 was repeated but using 20 parts of bis-(2-bromoethyl) phosphoramidate and 214 parts of the di-isocyanate. The resulting rigid polyether-based polyurethane foam was of equivalent flame-retardancy.

We claim:
1. A polyurethane comprising the reaction product of
 (i) an organic polyisocyanate,
 (ii) at least one polyhydroxy compound selected from the group consisting of polyethers and polyesters, each having a hydroxy functionality of 2 to 4 and a molecular weight of at least 400, and
 (iii) at least one phosphoramidate of the formula (RO)$_2$P(=O)NH$_2$ wherein R is selected from the group consisting of alkyl, alkenyl, halogen-substituted alkyl and halogen-substituted alkenyl groups, each having 1 to 10 carbon atoms, monocyclicaryl and halogen substituted monocyclicaryl groups, the amount of said phosphoramidate being up to 50% by weight of the total weight of said polyhydroxy compound and said phosphoramidate.

2. The polyurethane of claim 1 wherein the molecular weight of said polyhydroxy compounds is between 400 and 4,000.

3. A foamed polyurethane comprising the reaction product of
 (i) an organic polyisocyanate,
 (ii) a small controlled amount of water sufficient to cause foaming,
 (iii) at least one polyhydroxyl compound selected from the group consisting of polyethers and polyesters, each having a hydroxyl functionality of 2 to 4 and a molecular weight of at least 400, and (iv) at least one phosphoramidate of the formula $(RO)_2P(=O)NH_2$ wherein R is selected from the group consisting of alkyl, alkenyl, halogen-substituted alkyl and halogen-substituted alkenyl groups, each having 1 to 10 carbon atoms, monocyclicaryl and halogen substituted monocyclicaryl groups, the amount of said phosphoramidate being up to 50% by weight of the total weight of said polyhydroxy compound and said phosphoramidate.

4. The polyurethane of claim 3, in which the said polyhydroxy compound is a polyether which has a hydroxyl functionality of from 2 to 4, is a condensate of propylene oxide and has a molecular weight of from 1000 to 4000.

5. The polyurethane of claim 3 wherein said phosphoramidate is in an amount between 15% and 25% by weight of the total weight of said polyhydroxy compound and said phosphoramidate.

6. The polyurethane of claim 5, in which the said phosphoramidate is selected from the groups consisting of bis-(2-chloroethyl)-, bis-(2-bromoethyl)-, bis-(2,3- dibromopropyl)-, bis-(chlorophenyl)-, and bis-(bromophenyl)-phosphoramidates.

References Cited by the Examiner
UNITED STATES PATENTS

| | | | |
|---|---|---|---|
| 2,832,745 | 4/1958 | Hechenbleikner | 260—461.306 |
| 3,049,545 | 8/1962 | Birum | 260—2.5 |
| 3,058,941 | 10/1962 | Birum | 260—2.5 |
| 3,142,651 | 7/1964 | Friedman | 260—2.5 |

LEON J. BERCOVITZ, *Primary Examiner.*

DONALD E. CZAJA, *Examiner.*